(12) United States Patent
Kumar

(10) Patent No.: US 8,332,611 B2
(45) Date of Patent: Dec. 11, 2012

(54) METHOD AND SYSTEM FOR MANAGING MEMORY

(75) Inventor: Muppirala Kishore Kumar, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1648 days.

(21) Appl. No.: 11/237,865

(22) Filed: Sep. 29, 2005

(65) Prior Publication Data

US 2006/0075204 A1 Apr. 6, 2006

(30) Foreign Application Priority Data

Oct. 2, 2004 (GB) .................................... 0421947.3

(51) Int. Cl.
    *G06F 12/00* (2006.01)
(52) U.S. Cl. ................. 711/173; 711/170; 711/E12.006
(58) Field of Classification Search .................. 711/173, 711/170, E12.006
    See application file for complete search history.

(56) References Cited

U.S. PATENT DOCUMENTS

| 5,535,369 A | 7/1996 | Wells |
| 6,101,525 A | 8/2000 | Hecker |
| 6,115,705 A | 9/2000 | Larson |
| 2001/0049764 A1 | 12/2001 | Lu |
| 2002/0016891 A1 | 2/2002 | Noel et al. |
| 2003/0056076 A1 | 3/2003 | Cook |
| 2003/0212873 A1 | 11/2003 | Lee et al. |
| 2003/0217153 A1 | 11/2003 | Rao et al. |

FOREIGN PATENT DOCUMENTS

WO    WO 03/009144    1/2003

*Primary Examiner* — Mardochee Chery

(57) ABSTRACT

The present invention relates to methods for managing memory. More particularly, but not exclusively, the present invention relates to methods for managing memory across a plurality of partitions. A first method is disclosed which allocates memory across a plurality of partitions and includes the steps of: establishing a pool of free memory 27; allocating some of the free memory 30 to a target partition when required; identifying memory 40 within one or more source partitions to replace the allocated free memory; cleaning 42 the identified memory; and adding the cleaned memory to the pool 50. A second method for allocating memory across a plurality of partitions is also disclosed. The second method includes the steps of: monitoring the workloads of each partition; identifying memory 66 from a lesser-loaded source partition to transfer to a free memory pool; cleaning 67 the identified memory; transferring the cleaned memory to the free memory pool 70; and allocating memory 80 from the free memory pool to a target partition when required. Systems and computer software for managing memory are also disclosed.

21 Claims, 9 Drawing Sheets

METHOD AND SYSTEM FOR MANAGING MEMORY

FIELD OF INVENTION

The present invention relates to a method and system for managing memory. More particularly, but not exclusively, the present invention relates to a method and system for managing memory across a plurality of partitions.

BACKGROUND OF THE INVENTION

As the server market is headed towards consolidation, high-end systems supporting partitioning of the server to smaller systems running multiple instances of Operating Systems (OS) are gaining acceptance.

Present day systems support two types of partitioning mechanisms:

Hard partitions—the partitions are electrically isolated, have their own CPU, Memory and IO resources. Hardware faults in these partitions are self contained and do not affect the other partitions within the same server complex. The users can choose to dynamically expand resources within a hard partition by adding more resources which include CPUs, memory and IO slots. Usually the hard partitions are expanded by adding a group of CPUs, memory and IO to the existing partition.

Virtual Partitions—these are software partitions created within a hard partition. These partitions share the resources within the "hard partition" and avoid stepping on each other's area by a low level partition manager (or monitor) controlling the visibility of resources to different instances of Operating systems executing on different virtual partitions. These partitions provide software fault isolation across OS instances.

Technologies exist to help add resources (CPU, memory and I/O) to pre-existing virtual partitions. Likewise, it is possible to migrate resources between the virtual partitions of an existing system (or hard partition).

Partitioning solutions from vendors, such as HP and IBM, help customers consolidate their systems and drive system utilization levels up by employing load balancing and resource migration utilities over the virtual partitions to meet the varying demands of applications deployed over the consolidated and partitioned servers.

Current partitioning solutions provide almost instantaneous migration/addition of CPU resources to a partition—either from a free pool of CPUs or by stealing from a neighbouring partition where the CPU is perhaps underutilized.

However, migration of memory or IO resource from use by one partition to another often occupies a significant amount of time, running into several minutes and at times hours.

Unfortunately, applications cannot perform well when only one of the key resources it needs is satisfied—only the CPU. They are usually hungry for more memory which may not be immediately available.

One existing method to move memory between two virtual partitions uses the following steps (Partition One is the partition to move memory to and Partition Two is the partition from where the memory is being taken away):

i) Identify the physical memory that can move from Partition Two to Partition One.
ii) Clean the identified physical memory range by moving data within the range to other pages in Partition Two or swapping out to disk.
iii) Ensure that the memory management subsystem of the OS running on Partition Two removes the physical memory range related information from its internal data structures (to prevent "stamping" on the memory area by Partition Two after the memory migrates out of that partition).
iv) Update the memory management subsystem of the OS running on Partition One to permit access to the new physical address range.

A significant delay occurs between when Partition One requires the memory and when Partition Two can deliver the memory. This delay is mostly due to step (ii).

US 20030212873A1 describes method and apparatus for managing memory blocks in a logical partitioned data processing system. This document describes how memory blocks from one partition are made global and then added to a second partition.

This method does not describe the immediate transfer of memory from one partition to another to meet instant demand.

US 20030217153A1 describes a computer system with dynamically configurable capacity.

This document describes a Capacity on Demand (COD) system to meet the processing needs of partitions by adding in Field Replaceable Units (FRU)s.

This method therefore covers the addition of physical components to meet memory needs rather than reallocating existing memory between partitions.

It is an object of the present invention to provide a method and system for managing memory across a plurality of partitions which overcomes or at least ameliorates a number of the disadvantages of existing methods mentioned above, or to at least provide a useful alternative.

SUMMARY OF THE INVENTION

According to a first aspect of the invention there is provided a method of allocating memory across a plurality of partitions, including the steps of:

i) establishing a pool of free memory;
ii) allocating some of the free memory to a target partition when required;
iii) identifying memory within one or more source partitions to replace the allocated free memory;
iv) cleaning the identified memory; and
v) adding the cleaned memory to the pool.

It is preferred that the partitions are virtual partitions and are executing separate instance of an operating system (OSes) on a single system. In one embodiment of the invention, the OS of one partition may be executing within the OS of another partition resulting in a Host/Guest architecture.

The amount of free memory to allocate may be determined by a user or by a work load monitoring tool.

It is preferred that the size of the pool is predetermined by an administrator.

Preferably, the step of allocating the memory to the target partition includes updating a memory management subsystem of an OS on the target partition to allow access to the allocated memory.

The step of cleaning the identified memory may include shifting data within the memory to other memory (such as memory within the source partition), swapping data within the memory to disk, and/or ensuring the source partition no longer is able to access the identified memory.

According to another aspect of the invention there is provided a method of allocating memory across a plurality of partitions, including the steps of:

i) monitoring the workloads of each partition;
ii) identifying memory from a lesser-loaded source partition to transfer to a free memory pool;

iii) cleaning the identified memory;

iv) transferring the cleaned memory to the free memory pool; and v) allocating memory from the free memory pool to a target partition when required.

It is preferred that the partitions are virtual partitions and are executing separate instance of an operating system (OSes) on a single system. In one embodiment of the invention, the OS of one partition may be executing within the OS of another partition resulting in a Host/Guest architecture.

Preferably, the lesser-loaded partition refers to the partition with the lesser memory load. The lesser memory load of a partition may be determined by using one or a combination of the following metrics: free memory within the partition, average free memory within the partition over a period of time, and frequency of use of memory by the partition.

The step of monitoring the workloads of each partition may be performed by a work load monitoring tool.

The step of identifying memory may be dependent on a condition such as a rule which is satisfied if CPU and/or memory utilisation in the lesser-loaded partition falls below a specified threshold.

The step of allocating memory to a target partition preferably occurs when the load on the target partition increases. The load increase may be determined by a work load monitoring tool or a user.

The free memory pool may be a fixed size or may be bounded by a minimum and maximum size. The size of the pool may be set by an administrator.

The step of cleaning the identified memory may include shifting data within the memory to other memory, swapping data within the memory to disk, and/or ensuring the source partition is no longer able to access the identified memory.

According to another aspect of the invention there is provided a method of charging users for memory usage wherein users are charged for the use of memory from when the memory is allocated from any free memory pool described above until the user replenishes the free memory pool.

According to another aspect of the invention there is provided a system for allocating memory across a plurality of partitions, including:

a processor arranged for establishing a free memory pool, allocating memory from the free memory pool to a partition when required, searching partitions for memory to replace the allocated memory, cleaning the replacement memory and adding the cleaned replacement memory to the free memory pool; and memory arranged for allocation to the free memory pool and allocation to a partition.

According to another aspect of the invention there is provided a system for allocating memory across a plurality of partitions, including:

a processor arranged for monitoring workloads of the partitions, identifying and cleaning memory from the lesser-loaded partitions, allocated the cleaned memory to a free memory pool, and allocating memory from the pool to partitions when required; and memory arranged for allocation to the free memory pool and allocation to a partition.

According to another aspect of the invention there is provided computer software for allocating memory across a plurality of partitions, including:

a module arranged for creating a free memory pool, allocating memory from the free memory pool to a partition when required, searching partitions for memory to replace the allocated memory, cleaning the replacement memory and adding the cleaned replacement memory to the free memory pool.

According to another aspect of the invention there is provided computer software for allocating memory across a plurality of partitions, including:

a module arranged for monitoring workloads of the partitions, identifying and cleaning memory from the lesser-loaded partitions, allocated the cleaned memory to a free memory pool, and allocating memory from the pool to partitions when required.

BRIEF DESCRIPTION OF THE DRAWINGS

Embodiments of the invention will now be described; by way of example only, with reference to the accompanying drawings in which.

DETAILED DESCRIPTION OF PREFERRED EMBODIMENTS

Embodiments of the present invention described herein relate to two methods for migrating physical memory between virtual partitions.

An embodiment of the invention will be described in relation to the migration of physical memory between two virtual partitions of a computer system executing different instances of Operating System images. It will be appreciated that embodiments of the invention can be generalised to function for more than two partitions with slight modification.

The first embodiment of the invention involves maintaining an amount of memory free and reserved to meet memory migration needs immediately. The reserved pool can be replenished after the memory has been migrated to the desired partition. This method will be referred to as the "Reserve Memory Pool" method.

The second embodiment of the invention involves the use of a system load monitoring tool to dynamically create a free memory pool from lesser loaded partitions to proactively meet the needs of partitions that are likely to need more memory. This method will be referred to as the "Dynamic Memory Balancing" method.

Figure 1:
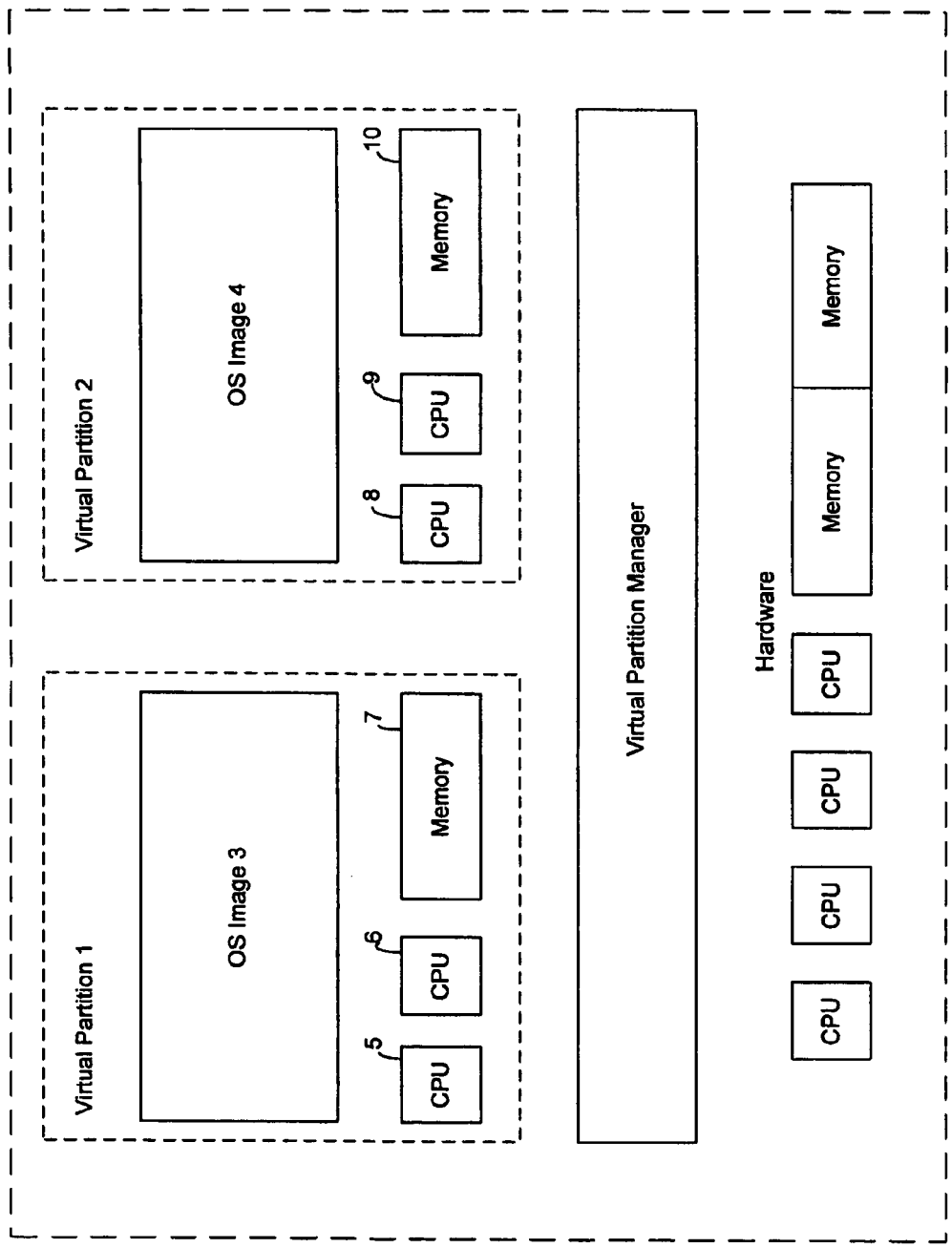
FIG. 1: shows a diagram illustrating a system partitioned into two virtual partitions according to an embodiment of the invention.

The various methods according to embodiments of the invention will be described in relation to a virtual partitioned system with two logical (virtual) partitions 1 and 2 each running a separate OS image (images 3 and 4 respectively) as shown in FIG. 1. Of the system's hardware resources, virtual partition 1 is allocated two CPUs (5 and 6) and half of the available memory (memory 7) and virtual partition 2 is allocated two CPUs (CPUs 8 and 9) and the other half of the available memory (memory 10).

Reserved Memory Pool

The reserved memory pool method supplies memory required by a partition (the target partition) from a pre-reserved memory pool to immediately meet the memory needs of the target partition. Later, any source partition can relinquish the same amount of memory (or part of it) by cleaning and releasing memory from its use to replenish the pool.

Figure 2:
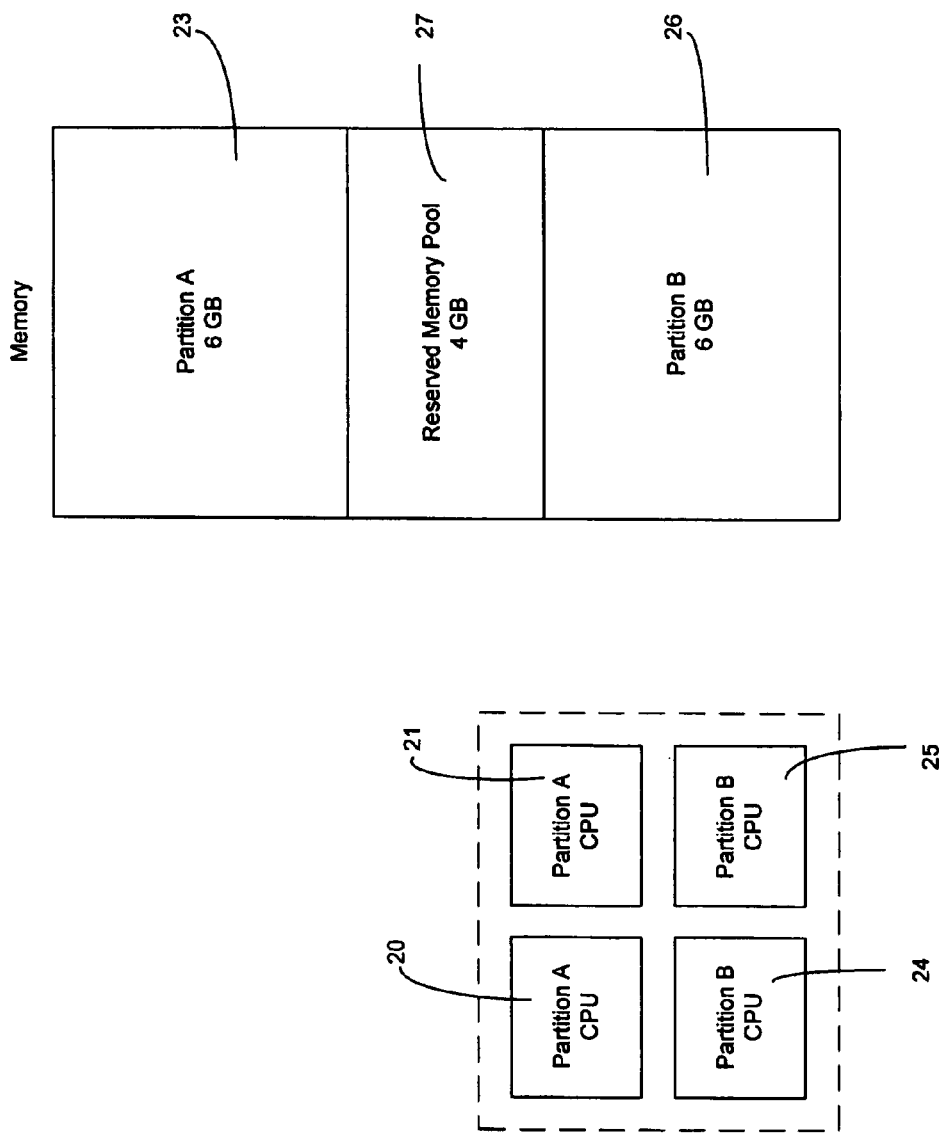
FIG. 2: shows a diagram illustrating memory and CPUs split between two partitions and a reserve pool according to a first embodiment of the invention.

FIG. 2 shows an example of a partitioned system where Partition A is allocated two CPUs 20 and 21, and six GB of memory 23. Partition B is allocated two CPUs 24 and 25, and six GB of memory 26. The reserved memory pool 27 is comprised of four GB of memory.

Figure 3:
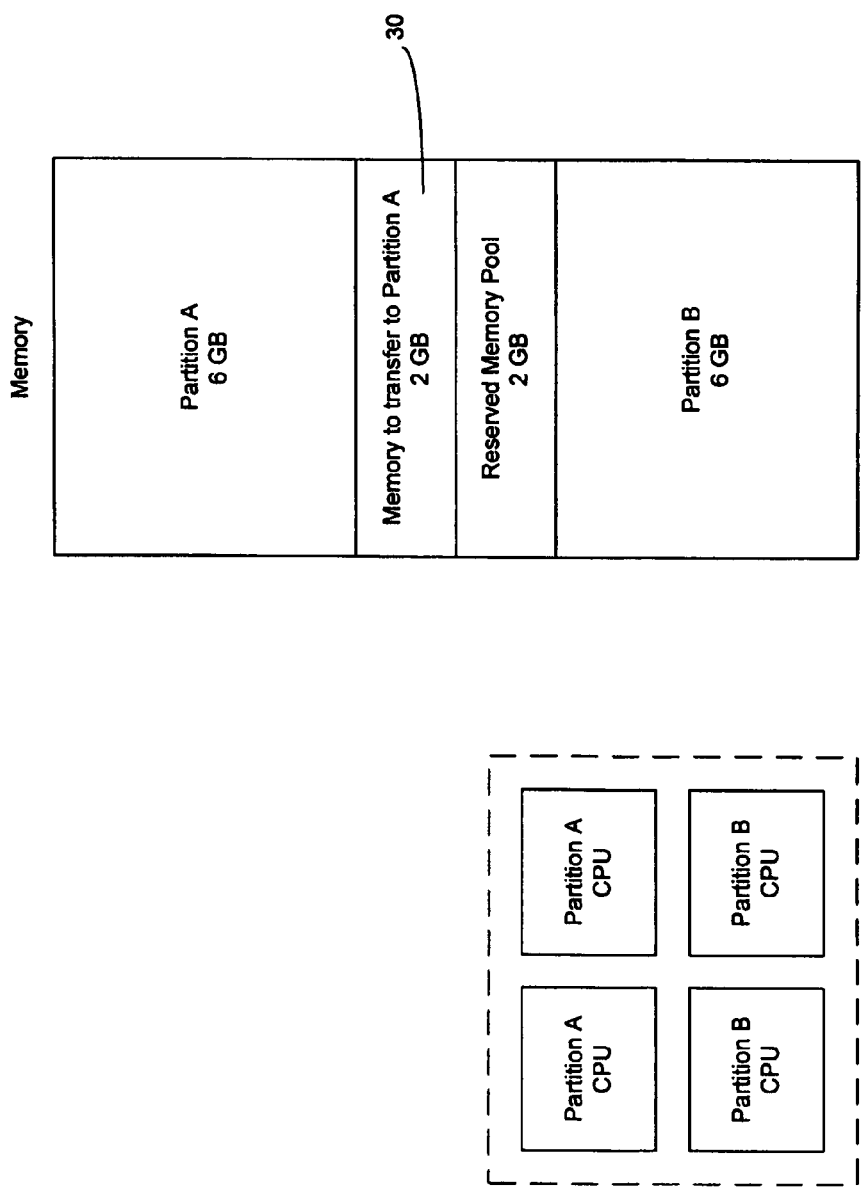
FIG. 3: shows a diagram illustrating part of the reserve pool being transferred to a target partition according to a first embodiment of the invention.
Figure 4:
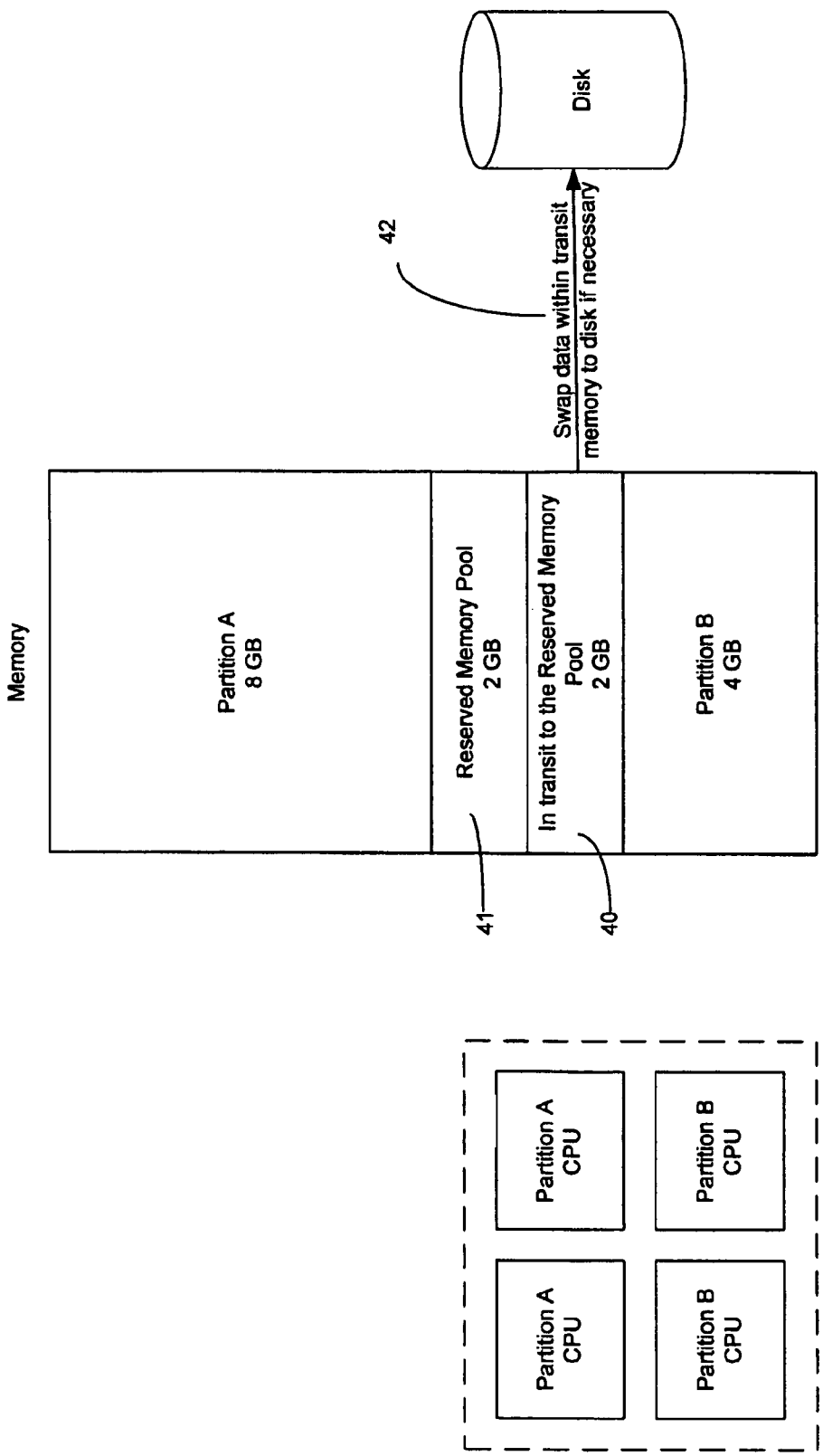
FIG. 4: shows a diagram illustrating part of the source partition's memory being transferred to the reserve pool according to a first embodiment of the invention.
Figure 5:
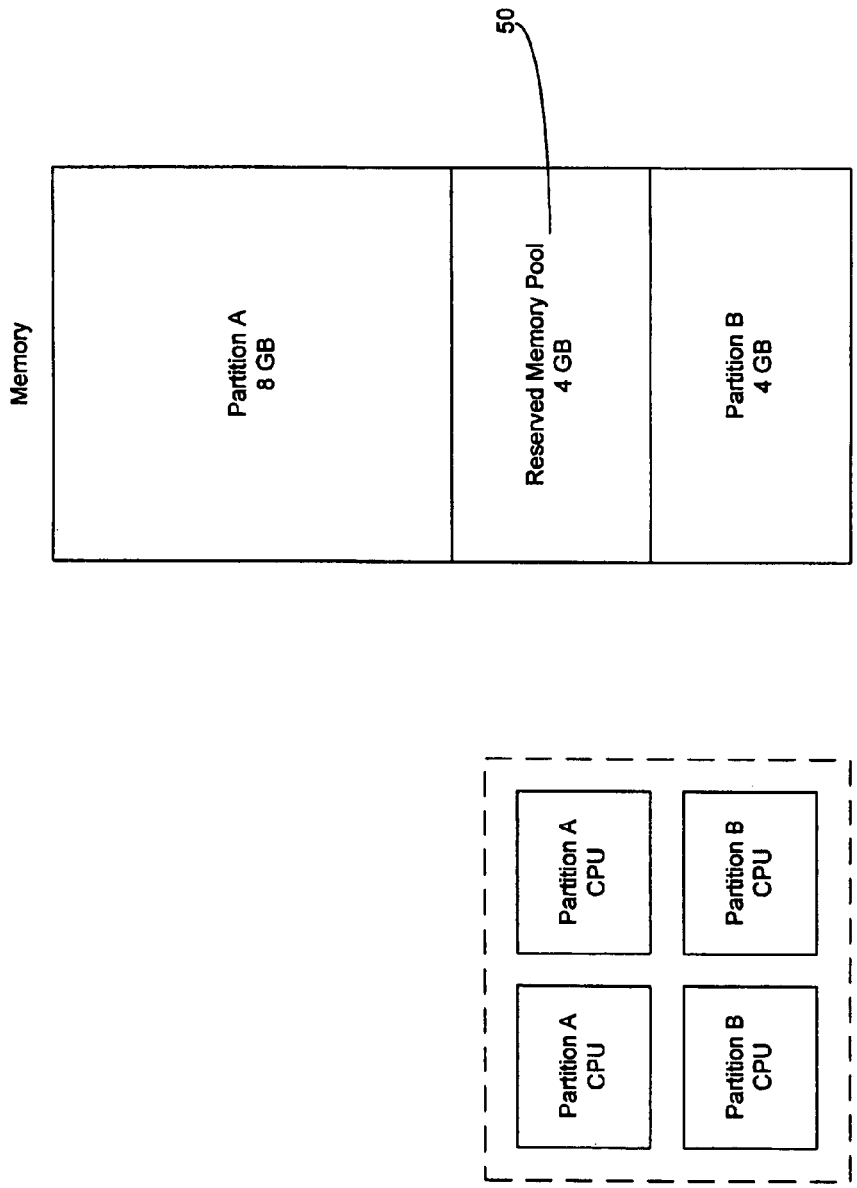
FIG. 5: shows a diagram illustrating the replenished reserve pool according to a first embodiment of the invention.
Figure 6:
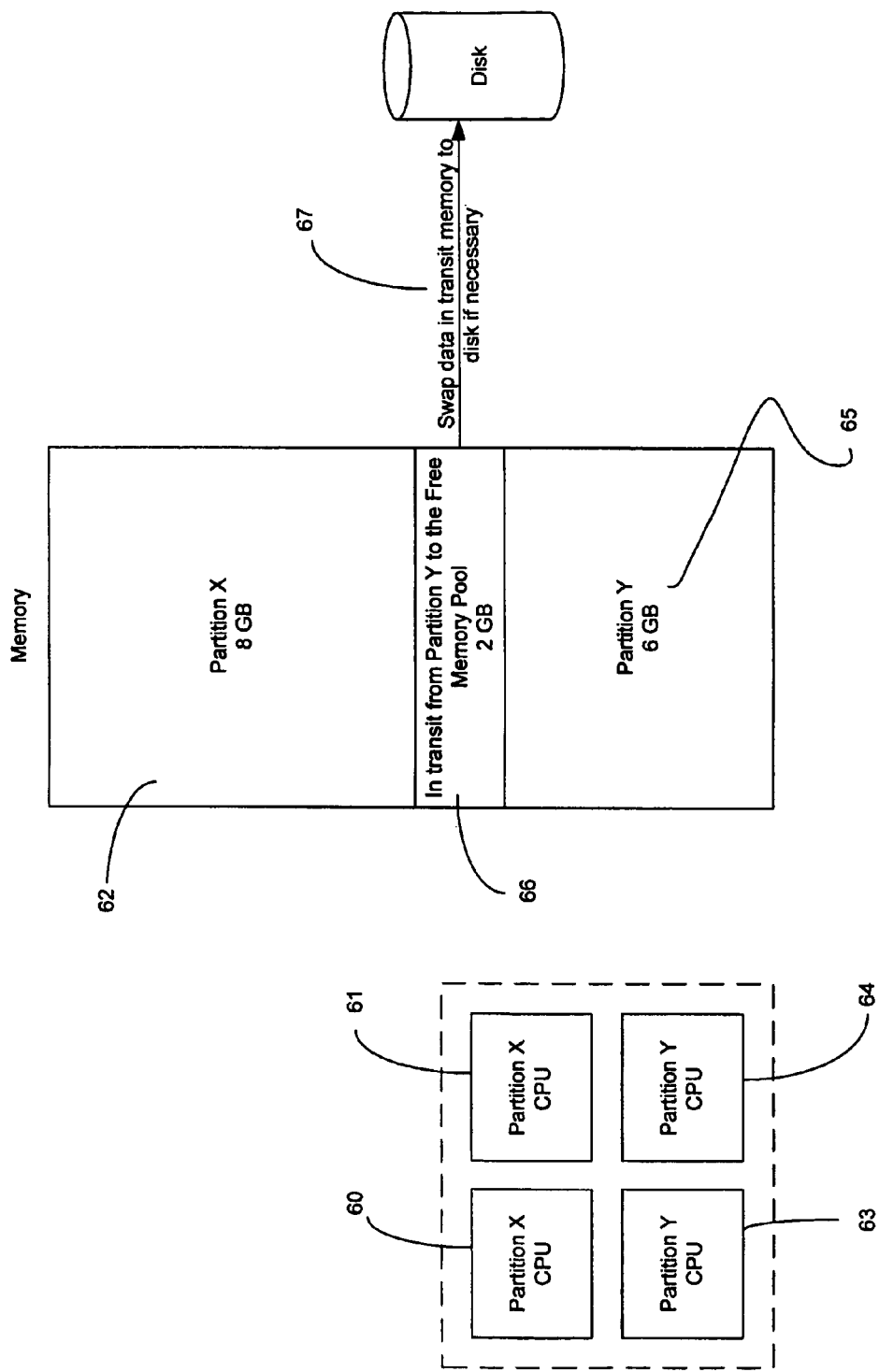
FIG. 6: shows a diagram illustrating memory and CPUs split between two partitions and a free memory pool being created from a lesser-loaded source partition according to a second embodiment of the invention.
Figure 7:
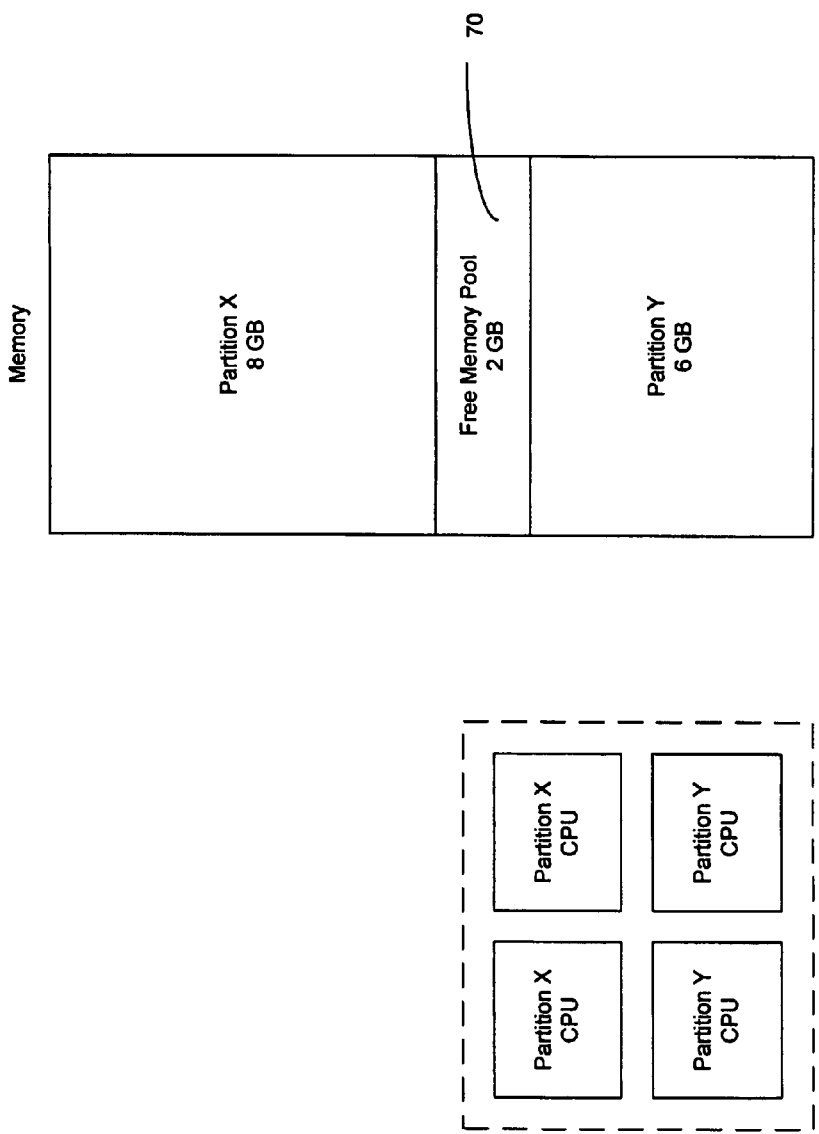
FIG. 7: shows a diagram illustrating a free memory pool created according to a second embodiment of the invention.
Figure 8:
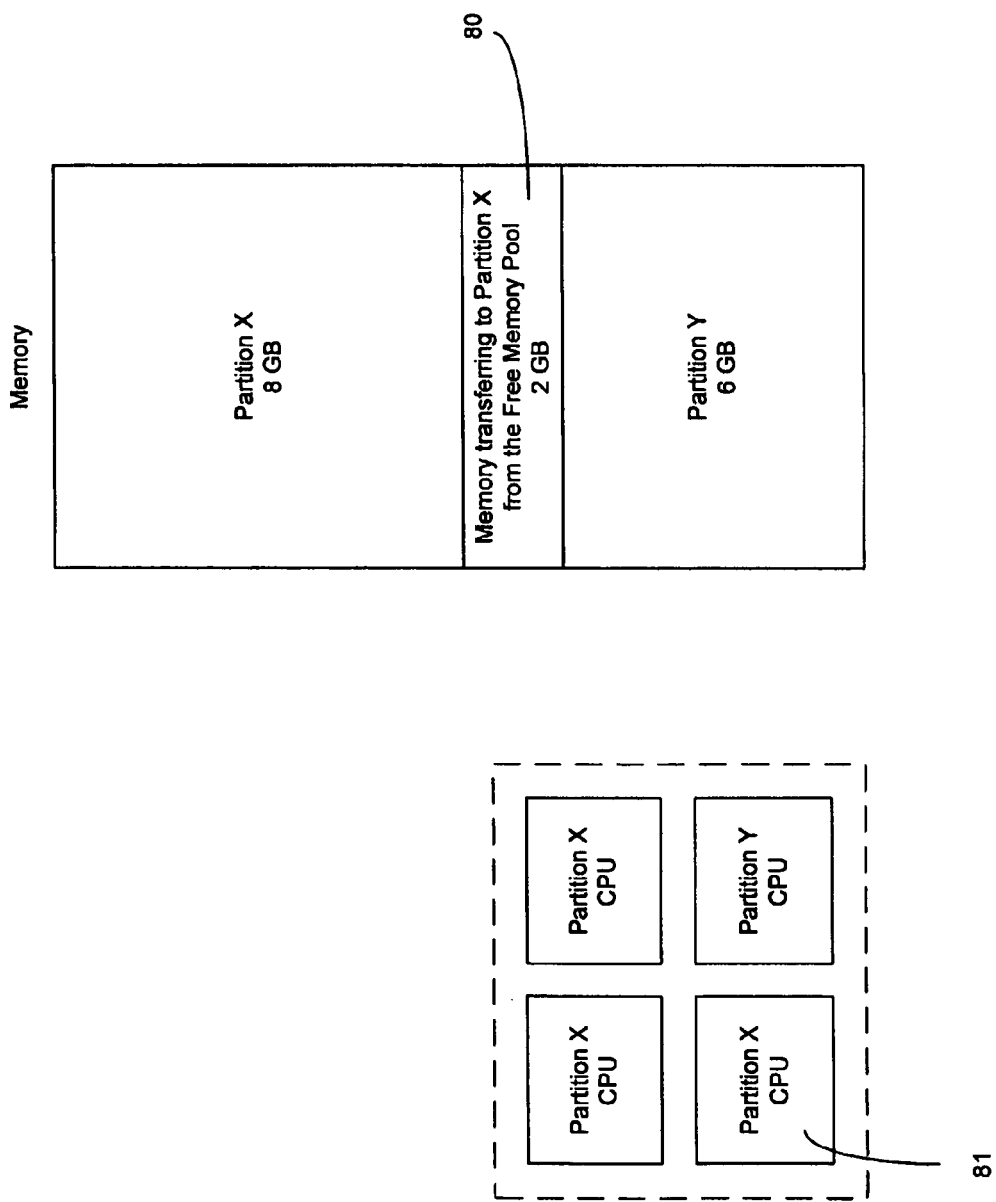
FIG. 8: shows a diagram illustrating the transfer of memory from the free memory pool to a needy target partition according to a second embodiment of the invention.
Figure 9:
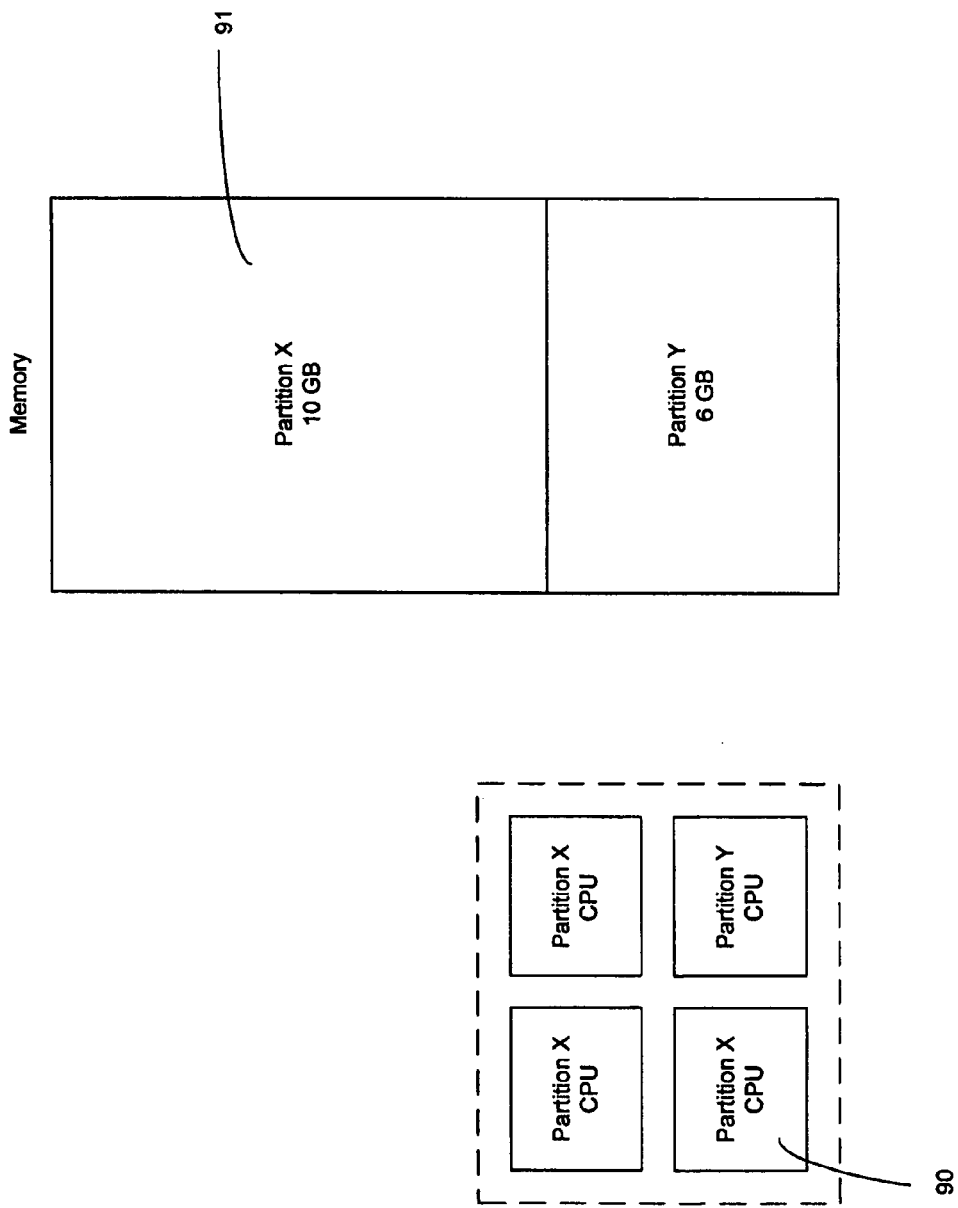
FIG. 9: shows a diagram illustrating the result of transferring memory from the free memory pool to the target partition according to a second embodiment of the invention.

The method will be described in relation to the example system with reference to FIGS. 3 to 5.

During execution of the system, Partition A may require more memory to continue operation of its processes effectively. The first step of the method is to detect this requirement. The requirement could be detected by a work load monitoring tool. However, it is preferred that the requirement for more memory is detected by a user. This is because the user can often guess when a partition is likely to require more memory.

Once the requirement is detected, the second step of the method is to transfer the required memory 30 for the target partition (Partition A) from the reserved memory pool and to update the memory management subsystem of the OS running on Partition A to utilize the additional memory.

It can be seen that the resource needs of Partition A are completely addressed at this point and the processes on this partition have their memory requirements immediately satisfied.

The next step of the method is to identify the physical memory 40 that can move from the source partition (Partition B) to the reserved memory pool 41 to replace the transferred memory 30.

The next step of the method is to clean the identified physical memory range which results in the data within the range being moved elsewhere to other pages in the source partition or swapped-out to disk 42.

Then the memory management subsystem of the OS running on the source partition is notified to remove the physical memory range related information from its internal data structures (to ensure that there is no "stamping" on the memory area by the source partition after the memory migrates out of the partition).

The final step of the method is to update the reserve memory pool 50 to reflect that this memory is available for future kick-starting of resource needs of a partition within the system.

The size of the pool can be configured by the system administrator. In some implementations of the method the pool could be a dynamic size rather than a set size.

It is preferred that in a system where the hardware is leased to customers, a method is used to charge the customers for memory used from the reserved memory pool. The method charges the system's customers for memory from the reserved memory pool when it is allocated to a partition on a time basis from when the memory was transferred to the partition until the reserved memory pool is replenished from another of the customer's partitions.

An example of the charging method will be described. An administrator configures a 2 GB reserved memory pool. A partition requires 1 GB memory and the user runs a command/utility within that partition to pull-in the required 1 GB from the pool (in this case maintained by the firmware, so the utility run by the user will trigger the OS to contact firmware to grant access rights for the additional 1 GB memory). The pool will be down to 1 GB and the "pay per use charge meter" would start ticking counting the amount of time for which the memory of the pool is in use by the customer. The user after some time (say 1 hour) decides that another partition can give-up 1 GB memory to replenish the pool, (s)he can run another utility (or the same utility with a different option) in that partition to release 1 GB memory from it. The partition could take 30 minutes to scrub the memory and return it to the system firmware to replenish the pool. The user will then be charged, under the method, for using 1 GB of memory from the pool for 1.5 hours.

Dynamic Memory Balancing

On systems where it may not be feasible to keep a dedicated pool of memory—either owing to the cost of additional memory or poor utilization of memory in this pool—a second alternative method is required.

One embodiment of the second method, Dynamic Memory Resource Balancing, utilises a work load monitoring tool to manage the resource allocations to processes (or process groups) within and across partitions of a system. The operating system HP-UX currently utilises a tool called the Work Load Manager (WLM) to perform this task. However, this tool only has, at present, the ability to facilitate the dynamic addition/removal of CPUs across partitions.

The method proposes a tool that is capable of tracking memory resource utilization and uses information from this to create a free memory pool from lesser loaded partitions. This pool is used as a memory "kick-start" for the partitions which are in need of more memory.

The method will be described referring to FIGS. 6 to 9 in relation to an example of a partitioned system. The example system has two partitions X and Y. Partition X is allocated two CPUs 60 and 61, and eight GB of memory 62. Partition Y is allocated two CPUs 63 and 64, and has initially eight GB of memory 65 and 66.

A modified work load monitoring tool has determined that Partition Y is the lesser-loaded partition and two GB of memory 66 from Partition Y is being transferred to a free memory pool.

In one implementation of the method, the tool can be continually executing in the background determining workloads, or it can be triggered by an event, such as a user initiated action.

The lesser-loaded partition is the partition with the lowest memory load. It will be appreciated that there are a number of metrics that can be used to determine the lesser memory load, such as amount of free memory, average free memory over a period of time, or frequency of use of the memory. It will be appreciated by those skilled in the art that the preferred method of determining lesser memory load will be a complex combination of more than one metric.

The determination to transfer memory from the lesser-loaded partition can be made on the basis of a set of rules or guidelines created by an administrator or user. For example, the rule to transfer memory from a partition and add it to the free memory pool could be triggered by a rule—"if the CPU and memory utilization on a partition falls below 50%, release 25% of its memory to the free memory pool".

In order to transfer the memory from a source partition (Partition Y) to the free memory pool, the following steps are performed:

a. Identify the physical memory 66 that can move from the source partition (Partition Y) to the free memory pool;
b. Clean the identified physical memory range so that the data is moved elsewhere to other pages in the system or swapped-out 67 to disk; and
c. Ensure that the memory management subsystem of the OS running on the source partition (Partition Y) removes the physical memory range related information from its internal data structures (to prevent "stamping" on the memory area by the source partition after the memory migrates).

The result of the transfer of memory from the lesser-loaded partition is the creation of a free memory pool 70 which can now be used as resource from which heavily loaded partitions can obtain memory quickly.

The next step of the method is initiated by a load increase on a partition (target partition). In this example, the workload on Partition X has increased.

This workload increase can be detected by a work load monitoring tool. Alternatively, the load increase could be detected by a user who could initiate the next step of the method.

The next step of the method is to determine whether memory should be allocated to the target partition (Partition X). This determination can be on the basis of a rule such as—"If the memory utilization of the partition reaches 95%, add 20% additional memory from the free memory pool, if that quantity is available."

If memory is to be allocated, it is transferred directly from the free memory pool to the target partition. In this example, two GB of memory 80 from the free memory pool is transferred to Partition X. In addition, a separate CPU monitoring tool has transferred a CPU 81 to Partition X as well.

The final step of the method is to notify the memory management subsystem of the target partition to that the additional memory can now be utilised by the OS on that partition.

The result of the method being applied to the example system is that Partition X now has access to three CPUs 90 and ten GB of memory 91, and is able to continue to execute its processes effectively.

In one implementation of the method, memory can be transferred incrementally to a partition as the load increases or it can be transferred when the load requirement reaches a certain level (as specified by a rule).

It is preferred that the memory is transferred in minimum chunk sizes set by an administrator.

For both methods described, the two instances of the OS communicate with each other using the firmware of the system.

It will be appreciated that the methods may be implemented on systems of different architecture such as a system where a Host OS (one partition) is executing a Guest OS (another partition). In such a case the OSes will not require the firmware to communicate with each other.

It will be further appreciated that the OS for one of the partition may be a different OS from the other partition altogether. For example, one partition might be executing HP-UX and the other partition might be executing Linux.

The memory to be shifted to the memory pool for both methods does not have to be a physical range of memory it can be a plurality of non-contiguous blocks selected from across the memory owned by the relinquishing partition. If the memory is moved to the memory pool within a Host/Guest OS architecture the memory can be moved as pages.

An advantage of the techniques described herein is that, as there is a free pool of memory either pre-created or dynamically created from lesser loaded partitions, there is always memory available to near instantaneously satisfy the memory requirements of a partition.

The consequent advantage of near instantaneous satisfaction of memory requirements is a general improved responsiveness and speed of a partitioned system.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method of allocating memory across a plurality of partitions, including the steps of:
   i) establishing a pool of free memory;
   ii) allocating some of the free memory to a target partition when required;
   iii) identifying memory within one or more source partitions to replace the allocated free memory;
   iv) cleaning the identified memory; and
   v) adding the cleaned memory to the pool.

2. A method as claimed in claim 1 wherein a user, workload monitoring tool or administrator determines the amount of free memory to allocate.

3. A method as claimed in claim 1 wherein the step of allocating the memory to the target partition includes the sub-step of updating a memory management subsystem of an OS on the target partition to permit access to the allocated memory.

4. A method as claimed claim 1 wherein the step of cleaning the identified memory includes the sub-step of shifting data within the memory to other memory.

5. A method as claimed in claim 4 wherein the other memory is within a source partition.

6. A method as claimed in claim 4 wherein the step of cleaning the identified memory includes the sub-step of swapping data within the memory to disk.

7. A method as claimed in claim 4 wherein the step of cleaning the identified memory includes the sub-step of ensuring the one or more source partitions does not access the identified memory.

8. A method as claimed in claim 7 wherein the ensuring step includes notifying a memory management subsystem of the one or more source partitions.

9. A method as claimed in claim 1 wherein the partitions are virtual partitions.

10. A method as claimed in claim 1 wherein the step of allocating the free memory includes the sub-step of updating a memory management subsystem of an OS executing on the target partition to permit access to the allocated memory.

11. A method as claimed in claim 1 wherein each partition is executing a different operating system instance.

12. A method as claimed in claim 1 wherein one of the partitions is executing an OS within an OS of another of the partitions.

13. A system comprising one or more processors arranged for performing the method of claim 1.

14. Computer software embodied on a computer-readable medium, the computer software arranged for performing the method of claim 1.

15. A method as claimed in claim 1, wherein all of the free memory that is allocated is replaced.

16. A system for allocating memory across a plurality of partitions, including:
   a processor arranged for establishing a free memory pool, allocating memory from the free memory pool to a target partition when required, searching partitions for memory to replace the allocated memory, cleaning the replacement memory and adding the cleaned replacement memory to the free memory pool; and
   memory arranged for allocation to the free memory pool and allocation to a partition.

17. A system as claimed in claim 16 wherein a user determines the amount of free memory to allocate.

18. A system as claimed in claim 16 wherein cleaning the replacement memory includes one or more steps from the set of: shifting data within the replacement memory to other memory within a source partition; swapping data within the replacement memory to disk; and ensuring a source partition does not access the replacement memory.

19. A system as claimed in claim 16 wherein each partition is executing a different operating system instance.

20. A system as claimed in claim 16 wherein one of the partitions is executing an OS within an OS of another of the partitions.

21. A system as claimed in claim 16, wherein all of the memory that is allocated is replaced.

* * * * *

UNITED STATES PATENT AND TRADEMARK OFFICE
CERTIFICATE OF CORRECTION

PATENT NO. : 8,332,611 B2
APPLICATION NO. : 11/237865
DATED : December 11, 2012
INVENTOR(S) : Muppirala Kishore Kumar It is certified that error appears in the above-identified patent and that said Letters Patent is hereby corrected as shown below:

In the Claims

In column 8, line 42, in Claim 4, after "claimed" insert -- in --.

Signed and Sealed this
Eighth Day of October, 2013

Teresa Stanek Rea
*Deputy Director of the United States Patent and Trademark Office*